US011913823B2

(12) United States Patent
Nance

(10) Patent No.: US 11,913,823 B2
(45) Date of Patent: Feb. 27, 2024

(54) METHOD FOR DETERMINING, PREDICTING AND CORRECTING BREAKOUT FRICTION ERRORS INFLUENCING AIRCRAFT TELESCOPIC LANDING GEAR STRUT PRESSURES

(71) Applicant: C. Kirk Nance, Keller, TX (US)

(72) Inventor: C. Kirk Nance, Keller, TX (US)

(*) Notice: Subject to any disclaimer, the term of this patent is extended or adjusted under 35 U.S.C. 154(b) by 317 days.

(21) Appl. No.: 17/086,344

(22) Filed: Oct. 31, 2020

(65) Prior Publication Data
US 2021/0048332 A1    Feb. 18, 2021

Related U.S. Application Data

(62) Division of application No. 15/841,836, filed on Dec. 14, 2017, now Pat. No. 10,859,431.

(51) Int. Cl.
*G01G 19/07* (2006.01)
*B64C 25/60* (2006.01)
(Continued)

(52) U.S. Cl.
CPC ............. *G01G 19/07* (2013.01); *B64C 25/60* (2013.01); *F16F 9/0209* (2013.01);
(Continued)

(58) Field of Classification Search
CPC ...... G01G 19/07; G01G 19/028; B64C 25/60; F16F 9/0209; F16F 2222/04; F16F 2230/0047; F16F 2230/08
See application file for complete search history.

(56) References Cited

U.S. PATENT DOCUMENTS 3,473,369 A   10/1969   Garrison
3,581,836 A    6/1971   Segerdahl et al.
(Continued)

FOREIGN PATENT DOCUMENTS

EP    2417372 A1    2/2012

OTHER PUBLICATIONS

Yao et al., The Design and Test Result of Pressure Distortion Compensation Device in Weight and Balance System, Jun. 22-26, 2015, AIAA Flight Testing Conference, Dallas, TX, 10 pp. (Year: 2015).*

*Primary Examiner* — Toan M Le
(74) *Attorney, Agent, or Firm* — Brian K. Yost; Decker Jones, PC

(57) ABSTRACT

Aircraft landing gear strut breakout friction values are used to correct measured strut pressure as related to the amount of weight supported; with the ability to generate and refine the breakout friction value database, and ability to predict a future breakout friction correction value by trending historical measurements, as compared to recent measurements, as further compared to real-time breakout friction values. The system is used in monitoring, measuring, computing and displaying the weight and center of gravity for aircraft utilizing telescopic oleo landing gear struts. Pressure sensors, temperature sensors, humidity sensors, axle deflection sensors, accelerometers, inclinometers are mounted in relation to each of the landing gear struts to monitor, measure and record strut pressure as related to strut telescopic movement, rates of strut telescopic movement, axle deflection, current temperature, current relative humidity, vertical acceleration; experienced by landing gear struts, as the aircraft proceeds through typical ground and flight operations.

1 Claim, 7 Drawing Sheets

(51) Int. Cl.
 *F16F 9/02* (2006.01)
 *G01G 19/02* (2006.01)
(52) U.S. Cl.
 CPC ........ *G01G 19/028* (2013.01); *F16F 2222/04* (2013.01); *F16F 2230/0047* (2013.01); *F16F 2230/08* (2013.01)

(56) References Cited

U.S. PATENT DOCUMENTS

| | | |
|---|---|---|
| 4,007,894 A | 2/1977 | Hartel |
| 4,979,595 A | 12/1990 | Paton |
| 5,214,586 A | 5/1993 | Nance |
| 5,521,827 A | 5/1996 | Lindberg et al. |
| 5,548,517 A | 8/1996 | Nance |
| 6,032,090 A | 2/2000 | von Bose |
| 6,128,951 A | 10/2000 | Nance |
| 6,237,406 B1 | 5/2001 | Nance |
| 6,237,407 B1 | 5/2001 | Nance |
| 7,967,244 B2 | 6/2011 | Long et al. |
| 2006/0220918 A1 | 10/2006 | Stockwell et al. |

* cited by examiner

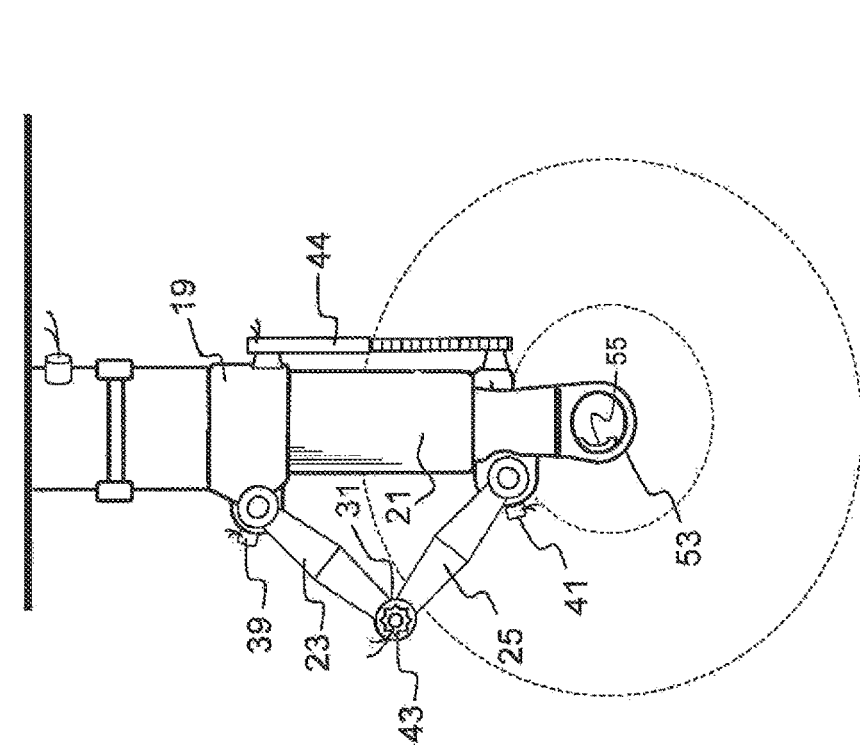
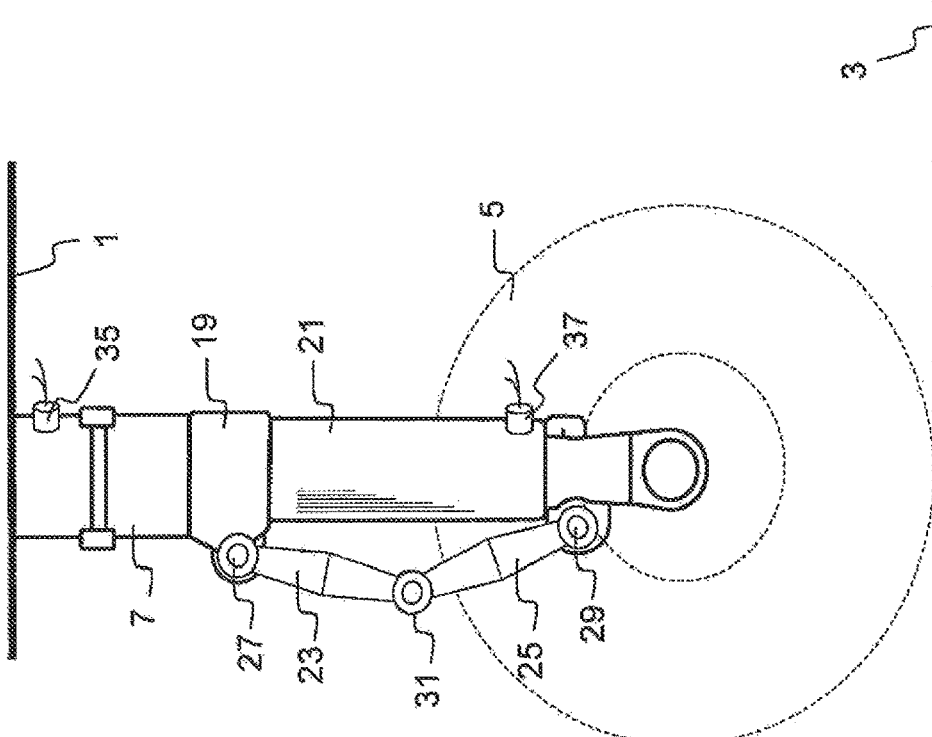
FIG. 2b
FIG. 2a

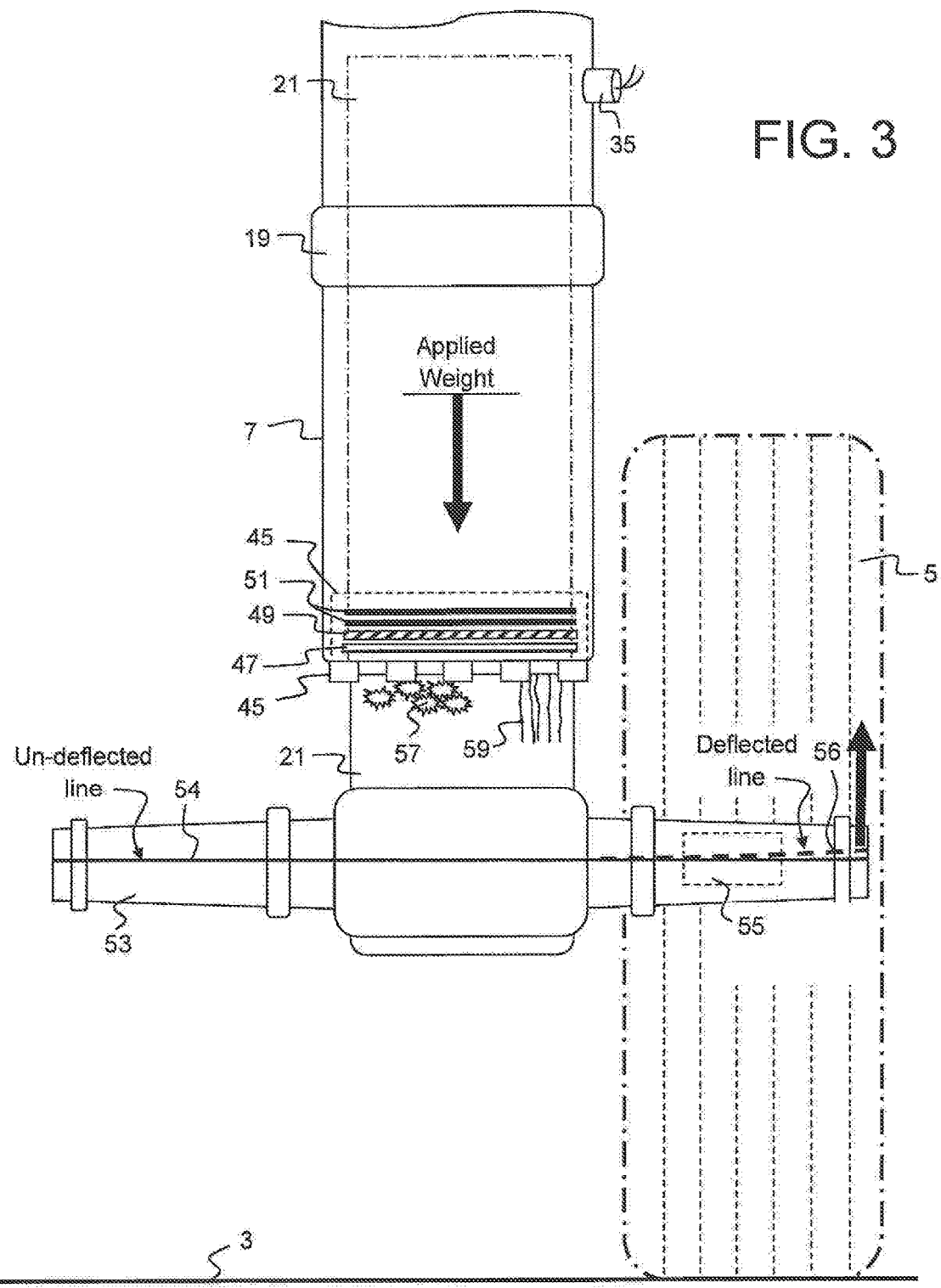

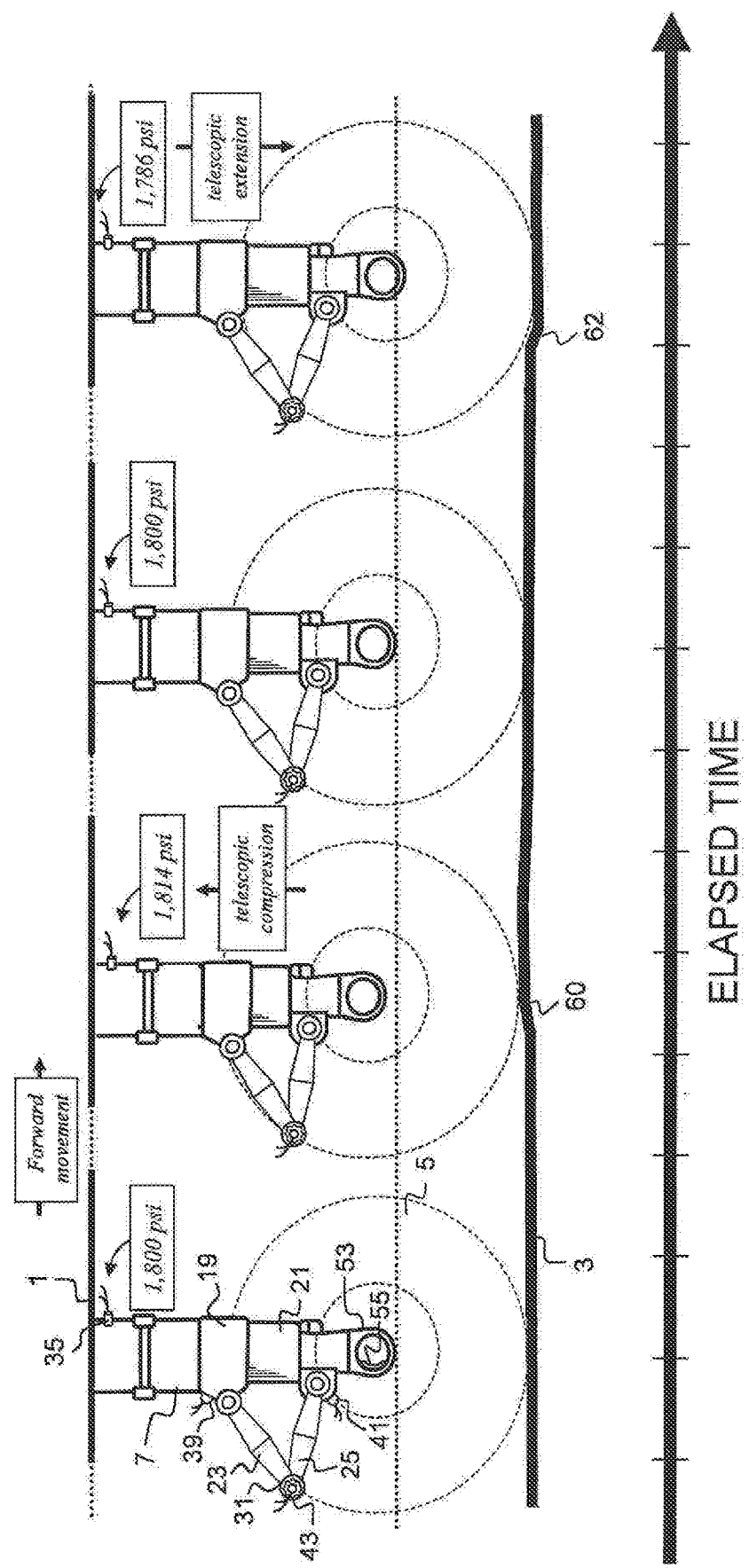

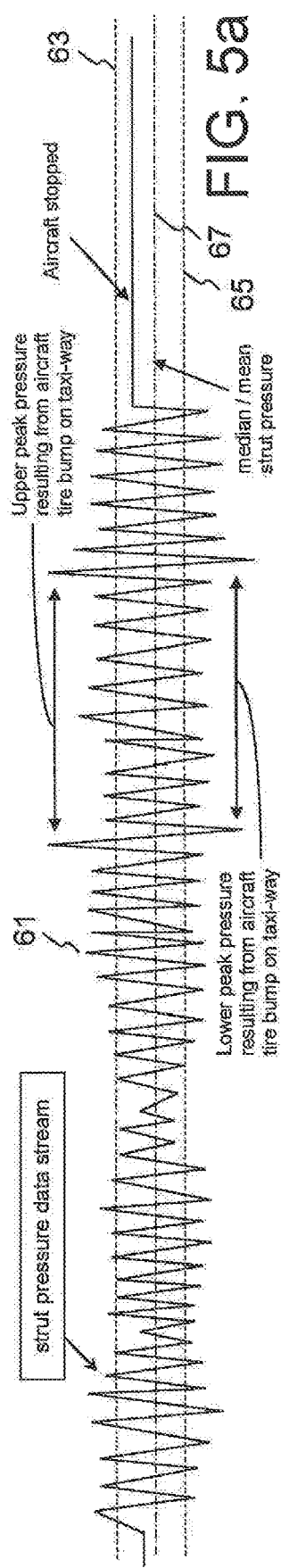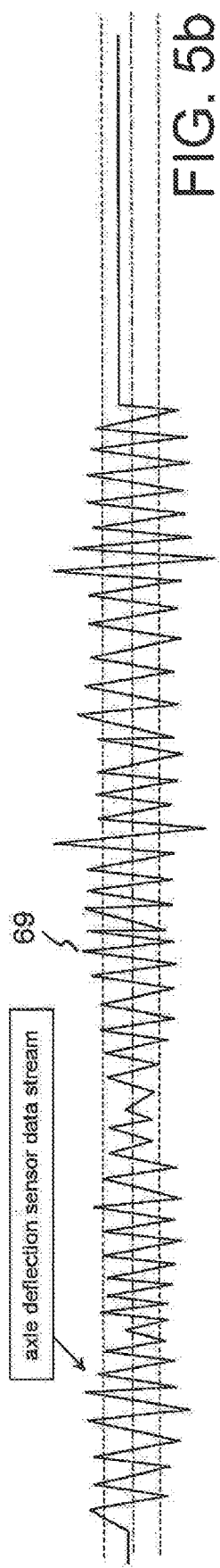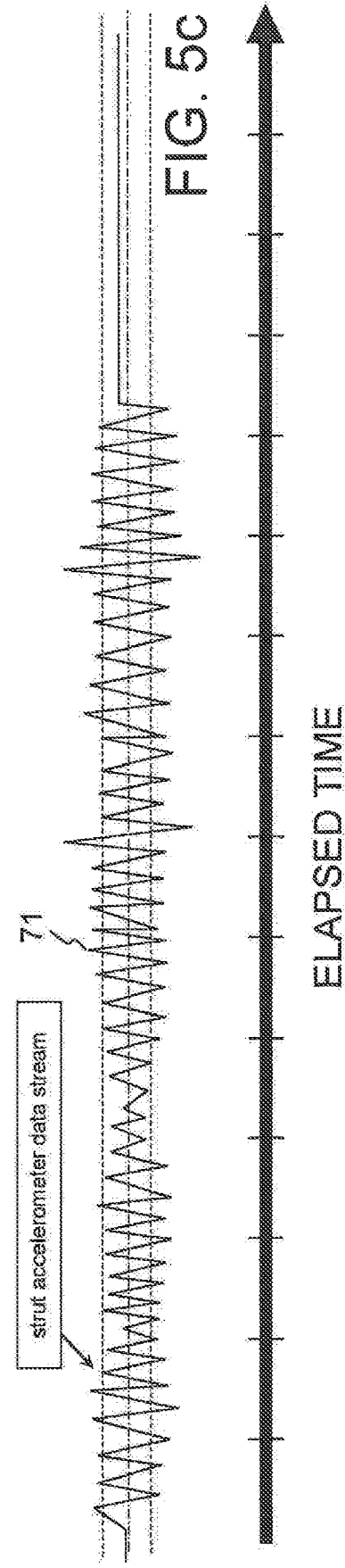

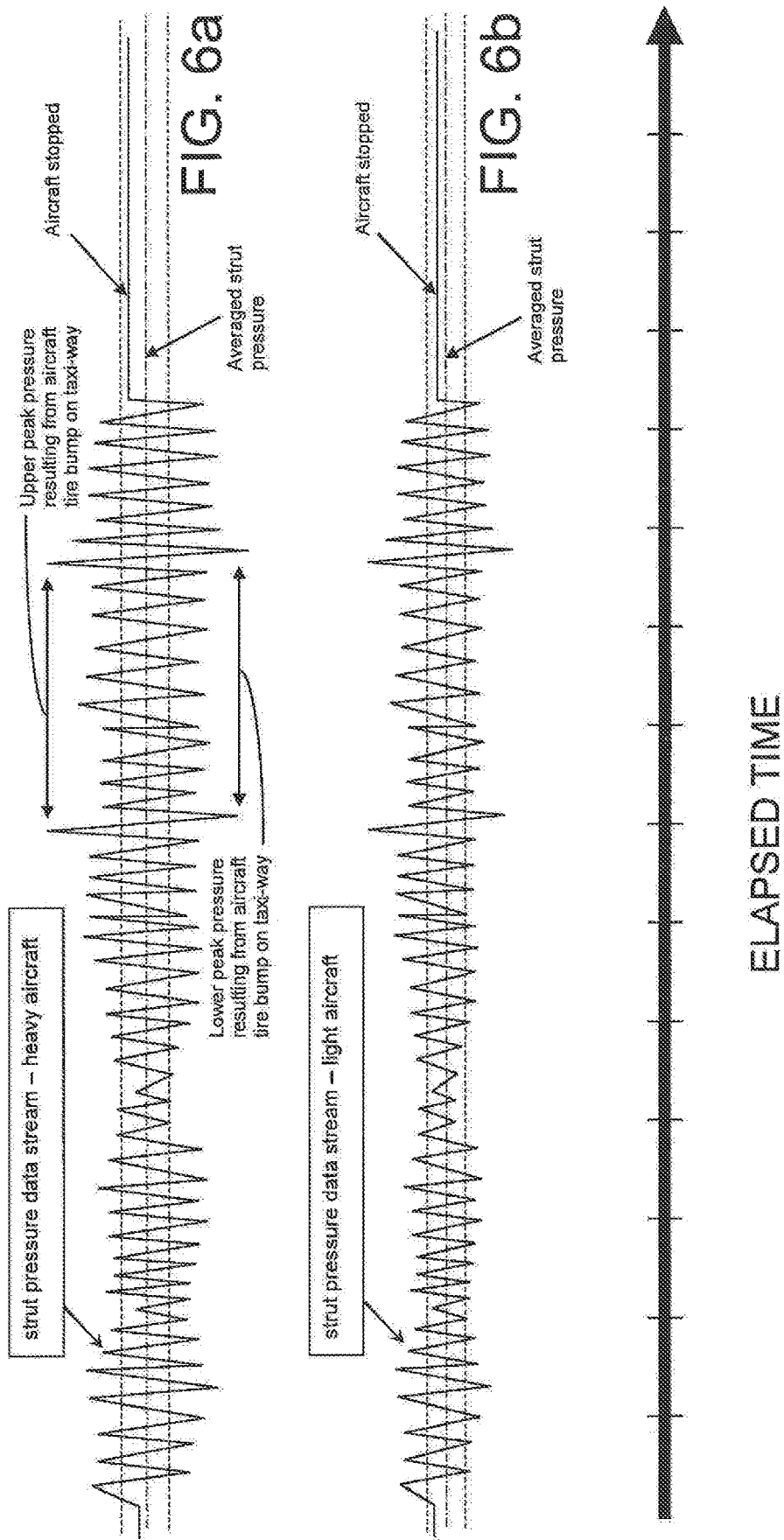

METHOD FOR DETERMINING, PREDICTING AND CORRECTING BREAKOUT FRICTION ERRORS INFLUENCING AIRCRAFT TELESCOPIC LANDING GEAR STRUT PRESSURES

This application is a divisional application of U.S. patent application Ser. No. 15/841,836 filed Dec. 14, 2017, the contents of which is incorporated by reference herein in its entirety.

BACKGROUND OF THE INVENTION

Automated onboard aircraft weight and balance systems have been an aviation goal for over 50 years. There are many prior art methods and designs for determining aircraft weight; many of these designs include the measurement of internal pressure within oleo type telescopic landing gear struts. There remains an industry desire to develop a method which deliverers an accurate aircraft weight determination with a minimal weight penalty added to the weight of the airframe, such penalty created by the added apparatus and hardware components required for some of these prior art systems.

An aircraft is typically supported by plural landing gear struts. In many if not most cases, aircraft are supported by three landing gear struts. Each landing gear strut is designed much like, and incorporates many of the features of a typical telescopic shock absorber. The shock absorber of the landing gear strut comprises internal fluids, of both hydraulic oil and compressed gas. The aircraft weight is transferred to and is identified by the pressures contained within the landing gear struts. More simply said . . . "the weight of an aircraft rests on three pockets of compressed gas." The supported weight is proportional to internal landing gear strut pressure measured in "psi" (pounds per square inch). The aircraft landing gear strut can be used as an aircraft weighing scale, if the measured strut pressure is corrected for errors caused by landing gear strut seal friction.

When measuring the weight of an aircraft supported by oleo struts, the aircraft weight can be classified into two types. The first type of weight is commonly referred to as "sprung weight." The sprung weight is the vast majority of the aircraft weight and is suspended above the "pockets" of compressed gas, within the telescopic landing gear strut. The second type of weight is a much smaller amount of the total weight and is commonly referred to as "unsprung weight." Unsprung weight is the weight of the landing gear components such as: brakes, wheels, tires and axles; which are located below the pockets of compressed gas. The unsprung weight is virtually a constant and unchanging weight. Brake wear and tire wear are the only variations to unsprung weight; and in the consideration of the aircraft total weight, the changes in unsprung-weight are a very minimal amount.

The weight of the aircraft can be determined from the measurement of landing gear strut pressure, if errors in strut pressure induced by landing gear strut seal friction are corrected. As an example: when weight is added to an aircraft and subsequently transferred to the landing gear, the landing gear strut should immediately begin to compress and the pressure within the strut should immediately increase, in direct proportion to the applied weight. This does not happen. The weight applied to each strut will not be immediately transferred to the working pressure within the landing gear strut, but instead be initially supported by landing gear strut seal friction, which is created by the rubbing of telescopically sliding components within the landing gear such as the seals, gland nut, piston wiper and piston scraper; against the strut piston surface. Frictional forces within the strut will support the initially applied weight, creating, a falsely low strut pressure measurement as related to the actual weight supported. The measured pressure within strut will remain falsely low, even with the addition of more weight; until enough additional weight overcomes the weight supporting force of the seal friction, thus allowing the strut to initially compress. Once friction has been overcome and the strut begins to compress, strut pressure will increase in direct proportion to the amount of additional applied weight, but remain falsely low as compared to weight supported; due to the errors in strut pressure caused by landing gear strut seal friction. This strut seal friction is often referred to as "breakout friction."

A similar but opposite error occurs, as weight is removed from the landing gear. Friction will tend to trap the internal pressure within the strut until enough weight has been removed that the trapped internal strut pressure will then overcome the seal friction, allowing the strut to extend. Prior to any strut movement the strut pressure will now be falsely high as related to weight supported, caused by the seal friction restricting the strut's telescopic movement. Once breakout friction is overcome the strut begins to extend and internal pressure begins to reduce (reduce proportionally to the subsequent reduction of weight after strut movement), but the internal strut pressure will remain falsely high in portion to the amount of weight removed prior to strut movement and initial decreases in strut pressure. Internal pressure within a landing gear cannot change without an internal volume change within the strut. If strut breakout friction is restricting strut movement as weight is applied, the internal strut pressure will not recognize any changes in supported weight.

The invention described herein offers improvements to prior art systems which teach a method of strut pressure correction, by the creation of a look-up table stored within a computer memory, of previously measured breakout friction values, which have been recorded through a system calibration process. Then at some later date, assumptions are that these historical break-out friction values have not changed, and are equivalent to a current strut break-out friction. Prior art methodologies make the "assumption" that breakout friction values do not change.

The invention described herein uses a variety of "strut data harvesting" sensors including: a pressure sensor to measure internal strut pressure, and in particular the range of internal pressure. Additional sensors are used to measure: strut telescopic movement, rate of telescopic movement, range of internal strut pressure in relation to rate and range of telescopic movement. Still other sensors are used to measure changes in environmental conditions including strut temperature and the relative humidity surrounding the strut, which affect the pliability and texture of the compounds, which make up the strut's O-ring seals.

Monitoring, the range of strut telescopic movement is an important feature of this new invention because not all landing gear struts are maintained to the same servicing standards. Less comprehensive airline maintenance procedures can allow a landing gear to become improperly serviced where the strut will be operated with insufficient volumes of internal fluids, thus have a minimum amount of telescopic chrome piston exposed. A poorly serviced strut (ie: a "low strut") will allow the strut O-ring seals to travel over the chrome finish at the extreme lower surfaces of the strut piston. When a strut is properly serviced with ample chrome finish exposed, the forward half of this lower area of the main landing gear strut piston receive the most damage from rocks and gravel which are thrown into the air by the aircraft nose wheels during the high speeds of the take-off and landing runs. This flying debris will hit and cause damage to the forward facing, front half of the chrome finished surface, of the main landing gear strut piston. Damage to the chrome finish will create pits and chips in the surface of this lower portion of the strut piston, where a more coarse piston surface will alter the amount of breakout friction. A sensor which monitors and measures the amount of strut telescopic extension, determines the exact location of the strut seal travel across a particular section of the strut piston surface. A different breakout friction value for any scarred surface area of strut piston is recorded through the processes later described, within the software program and referenced in future "fiction prediction" determinations, when strut seal travel is identified in this location of the strut piston.

Prior art methods teach the determination of breakout friction through a calibration procedure employed during the time of the initial installation of the system's apparatus, where any and all future reference to look-up table corrections for the breakout friction values will find a fixed value determined at some time in the past. The invention described herein utilizes a continuous re-calibration method where breakout friction values are continually monitored, measured, and up-dated while the aircraft taxi; and are stored within the computer memory and look-up tables for future reference. Continual measurements are made during the daily operation of the aircraft. As the aircraft taxi and the landing gear tires roll across the un-even expansion joints within the concrete of the airport taxi-way. The bumping of the aircraft will exercise the landing gear struts forcing telescopic movement. Though the weight of the aircraft remains constant, the pressure within the telescopic strut will fluctuate up and down, caused by inertia from the vertical weight transfer of the aircraft. The patterns of high-peak pressure and low-peak pressure within the landing gear strut are recorded and compared to accelerometer measurements recorded through a parallel inertial weight transfer algorithm. Thousands of recorded and stored strut pressure measurements allow for the identification of the "range of high-to-low-to-high pressure differential" herein referred to as the "delta pressure" as the aircraft taxi at a constant and known weight; and at other subsequently determined and known aircraft weights. Identification of the delta pressure; and a further determination of an amount equal to 50% of the delta pressure will identify the amount of breakout friction for a specific direction of strut movement, in real-time. Breakout friction values, in relation to various aircraft weights, are continually updated for future use. Avoidance of the use of outdated and unreliable breakout friction values stored within a look-up table will insure more accurate aircraft weight determinations. Real-time measurements of delta pressures eliminate potential and probable errors created by using previously recorded values; and currently assuming them as accurate breakout friction values to correct subsequent friction errors; when such assumed values cannot account for any changes in frictional forces of landing gear components, caused by environmental effects such as temperature and humidity; nor changes in landing gear strut seal breakout friction patterns caused by, atypical wearing of strut seal mechanisms and/or imperfections in the surfaces of telescopically sliding components of the typical aircraft landing gear strut. Unrecognized changes in breakout friction will increase the error, when outdated friction data is used to correct strut pressure measurements.

In a search of the prior art, there are numerous onboard aircraft weight and balance systems which measure aircraft weight, utilizing methods and apparatus for measuring landing gear strut pressure and the further correction of measured pressure as it relates to the amount for weight supported, from pressure distortions in strut pressure cause by landing gear seal friction. Research of the prior art for the use of strut pressure to determine aircraft weight and balance can be divided into two basic strategies.

The first of these strategies use a method of pre-measuring the amount of strut seal breakout friction at the initial installation of the system/apparatus hardware onto the aircraft, and record the pre-measured friction values at each respective landing gear strut into a computer memory look-up table, for later use in the determination of aircraft weight. Variations of this approach are well documented and reference may be made to:

U.S. Pat. No. 5,214,586—Nance, teaches a method of an aircraft weight and balance system calibration process, with apparatus which utilizes a computer, including a look-up table memory for the storing and subsequent retrieval of previously measured landing gear strut breakout friction values.

U.S. Pat. No. 7,967,244—Long, teaches a method of an aircraft weight and balance system calibration process, with apparatus which utilizes a computer, including a look-up table memory for the storing and subsequent retrieval of previously measured landing gear strut breakout friction values, which had been recorded beforehand, during the system's calibration process. Additionally, through a method of simulating added weight or load onto the aircraft, applied weight increases are measured, prior to any increase in strut pressure, and are subsequently related to an archived value for strut breakout friction.

A second strategy for the measurement of strut breakout friction, is the method to "induce the exercising" of the aircraft's telescopic landing gear struts while the aircraft rests stationary, and the aircraft weight remains constant. By forcing the strut to move telescopically allows for the real-time-determination of strut "high and low peak pressure values" to correct for pressure distortions, as related to, weight supported. Variations of this approach are well documented and reference may be made to U.S. Patents:

| # 5,548,517 - Nance | # 5,521,827 - Lindberg |
| # 6,126,951 - Nance | # 6,237,406 - Nance |
| # 6,237,407 - Nance | |

Additional prior art related to aircraft landing gear friction are described in U.S. Pat. No. 6,032,090—von Bose; which teaches the additional art of exercising the landing gear strut with a pump to further measure both landing gear strut dynamic and sliding friction which also uses the measurement of aircraft vertical acceleration while the aircraft remains stationary in measuring the transition from dynamic to sliding seal fiction. The prior art of von Bose measures strut friction in real-time, with mechanical devices to force strut movement, and does not use any type of computer look-up table or memory to store strut seal friction values.

United States Patent Application Publication No. US/2006/0220918-A1—Stockwell, teaches of rotating landing gear strut O-ring seals within the housing of the strut cylinder, in a means to reduce landing gear strut seal friction, which is used to reduce frictional errors, in the measurement of aircraft weight.

Patent Publication Number EP 2,417,372 A1, —Balducci, teaches of a landing gear provided with a selective force transmission device. An apparatus with a controllable means to transfers the pressure load on frictional components, to net out the pressure differential to zero.

U.S. Pat. No. 4,007,894—Hartel, teaches a method and apparatus for minimizing axial friction forces in a cylinder-piston shock absorber and further teaches rotating the bearing structure with respect to the cylinder and piston. Such rotation minimizes axial friction forces in the assembly, allowing the fluid pressure to assume a value accurately reflecting the axial load.

U.S. Pat. No. 4,979,595—Paton, teaches of a fluid actuated friction damper with apparatus including a cylinder with an expandable piston assembly, made up of a piston having two spaced apart parallel end walls which form an annular chamber. A curved friction member is located between these edges in this opening, and is pressed against the inside of the cylinder by an underlying flexible actuator ring.

U.S. Pat. No. 3,581,836—Segerdahl, teaches a method for reducing frictional errors in determining the weight of an object supported by a pneumatic or hydraulic device. Where a device supporting an object has an internal pressure successively increased and decreased to determine the change in pressure experienced between the steady-state pressure required to raise the object and that pressure required to merely support the object. The lower state pressure plus ½ the difference between the higher and lower steady state pressure is then representative of the actual weight supported by the device.

The invention herein describes an improvement to the prior art methods, which offer a determination of past strut breakout friction values, based on historical data recorded during the system installation onto the aircraft; by extrapolating the trends of ever-changing: long-past, near-past and present friction values to "predict" the value for strut breakout friction in the near future.

The invention herein describes an improvement to reduce the weight penalty of the prior art methods which utilize complex and heavy; apparatus to force strut movement.

The invention herein describes a method to continually measure and to further evaluate and generate landing gear strut data, used to "predict" the amount of pressure correction required to offset for the errors in weight determination caused by landing gear strut seal friction. This improvement allows the aircraft weight measuring computer software to continually monitor, measure and update changing values for landing gear strut breakout friction.

Aircraft landing gear strut breakout friction will change and vary as a function of changing temperature, changing relative humidity, variations in aircraft load, which are directly reflected with variations of strut pressure. Modern O-ring seal designs directly increase the amount of the seal's mating surface area as internal pressure increases. As the rubber seals deflect, the pliable seal materials and will cause strut seal breakout friction to be higher with higher internal strut pressure, and breakout friction will be lower with lower internal strut pressure; and vary as a function of strut seal wear and changes in surface smoothness of the strut piston. Increases and decreases in these friction patterns are continuously monitored to detect "patterns of change" as well as "changes in patterns" over defined periods of time, over different locations of strut O-ring seal travel across strut piston surfaces, and changes in environmental factors. Detected changes in the continually measured and monitored friction patterns of each respective landing gear strut will create a continually updated data-base supporting the determination for a "prediction of breakout friction" relating to a particular landing gear strut; in a final determination of the aircraft weight measurement. The invention herein describes a method of tracking the friction characteristics of a particular landing gear strut, where that landing gear strut may be exchanged onto a different aircraft. The harvested data from a particular landing gear strut will travel with that strut, throughout the life of that strut, on whichever aircraft it may ultimately reside.

Typical airlines operate an aircraft up to 80,000 flight cycles throughout the life of the aircraft, with operations in environments ranging from tropical climates with high humidity, to arctic conditions with extremely low humidity. The software of this invention continually examines the ever-changing environmental conditions as related to strut delta pressure profiles and modifies the complex software look-up table matrix which is continually refreshed by recording thousands of pressure high-peak and low-peak samples in relation to the multiple variations in temperature and relative humidity in the variety of environments for which the aircraft may operate; for present and future reference in the determination and prediction of an accurate pressure correction value, for the errors in strut pressure due to friction. Aircraft vertical acceleration is also monitored as the aircraft taxi; where high-peak strut pressure and low-peak strut pressure measurements are monitored and corrected for both the vertical acceleration of the weight supported by the landing gear strut and adjustment made to correct for inertia.

SUMMARY OF THE INVENTION

It is one object of the present invention to provide improvements to prior art systems for measuring aircraft weight, when using landing gear strut pressure measurements, and further determining landing gear strut seal friction.

It is another object of the present invention to, provide a means to reduce the weight and complexity of prior systems which exercise the landing gear strut while measuring strut pressure to determine strut friction values.

It is another object of the present invention to provide a tool to compile and trend measured aircraft landing gear strut breakout friction patterns.

It is another object of the present invention to measure binding/friction values in landing gear rotating components, to be used to correct distortions in landing gear strut pressure, as that pressure relates to the weight supported.

BRIEF DESCRIPTION OF THE DRAWINGS

Although the features of this invention, which are considered to be novel, are expressed in the appended claims; further details as to preferred practices and as to the further objects and features thereof may be most readily comprehended through reference to the following description when taken in connection with the accompanying drawings, wherein:

FIGS. 2a and 2b are side views of a typical aircraft landing gear strut, with various elements of the invention attached to the landing gear strut.

FIG. 3 is a front view of a typical aircraft landing gear strut, illustrating various internal components of the strut, and examples, of corrosion and scarring on the strut piston which induces a change in strut seal friction; along with elements of the invention attached to the landing gear strut.

FIGS. 4a, 4b, 4c and 4d are side views of a typical aircraft landing gear strut, where various elements of the invention are attached to the landing gear strut and are identified on FIG. 4a; where FIGS. 4b, 4c and 4d further illustrate pressure differentials within the strut as it varies in telescopic extension and compression, as the aircraft moves horizontally along a somewhat un-even surface of an airport taxiway or runway, at a constant weight.

FIGS. 5a, 5b and 5c illustrate the parallel data-streams measurement and monitoring of landing gear strut pressure, axle deflection and vertical acceleration; where FIG. 5a illustrates variations in the changing internal landing gear strut pressure compared to FIG. 5b illustrating corresponding congruent changes in the landing gear axle deflection further compared to FIG. 5c illustrating corresponding congruent changes in the vertical acceleration of the aircraft, while at a constant weight, as it moves horizontally along a somewhat un-even surface of an airport taxiway or runway.

FIGS. 6a, and 6b illustrate the data-streams comparison of a measured and monitored range of higher delta pressure variations in a landing gear strut pressure of a heavy weight aircraft, as compared to lower delta pressure variations in the same landing gear strut while carrying a lower weight; as the aircraft moves horizontally along a somewhat un-even surface of an airport taxiway or runway, both aircraft taxiing at a respective constant weight.

DETAILED DESCRIPTION OF THE PREFERRED EMBODIMENT

Figure 1:
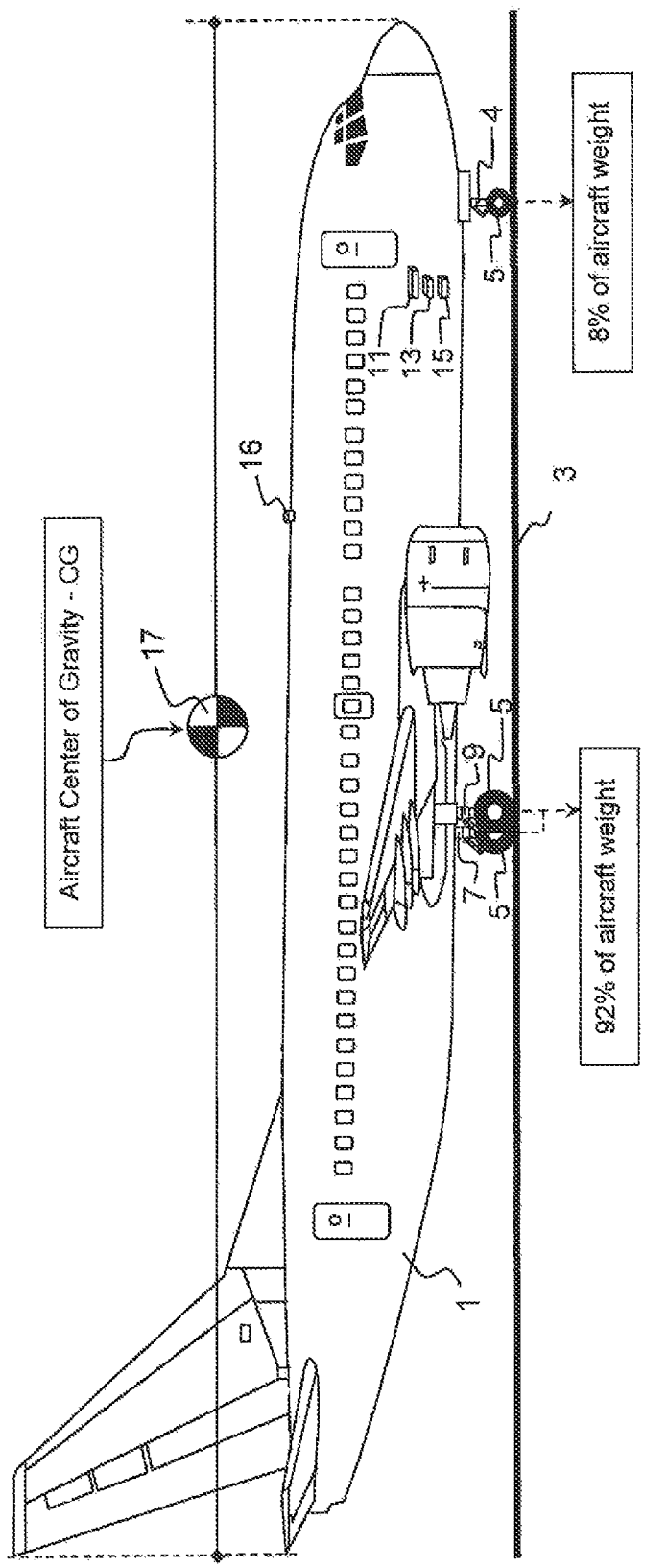
FIG. 1 is a side view of a typical air transport category aircraft, with a tricycle type landing gear in the extended position, resting on the around, illustrating the location of the aircraft longitudinal (fore and aft) Center of Gravity; with various components of the invention.

Aircraft onboard weight and balance systems, which use landing gear strut pressure to accurately determine aircraft weight, must account for errors in the measured landing gear strut pressure caused by landing gear strut seal breakout friction. Landing gear strut seal breakout friction values do not remain constant. A previously recorded and stored breakout friction correction value for a particular landing gear strut does not necessarily mean that earlier recorded correction value will be valid for the next time an aircraft weight is determined from some future measurement of that landing gear strut pressure. The ability to determine, and further predict, an appropriate correction value for break-out friction errors require adjustments to currently recorded strut pressure measurements for the interrelationship of physical and environmental, variations affecting the landing gear strut; at the time the value for the breakout friction correction is applied. The ability to predict what some future breakout friction correction value for a particular landing gear strut should be is accomplished by compiling a historical data-base of known breakout friction correction values, related to physical and environmental variations affecting the landing gear strut, to allow for the prediction, of future breakout friction error values to be made, at such time as the breakout friction correction value is applied, to a measured landing gear strut pressure in relation to the amount of weight the landing gear strut is supporting.

The physical and environmental variations affecting the landing gear strut and breakout friction correction values will be discussed.

An aircraft is typically supported by plural landing gear struts. In many if not most cases, aircraft are supported by three landing gear struts. Each landing gear strut is designed much like, and incorporates many of the features of a typical telescopic shock absorber. The shock absorber of the landing gear strut comprises internal fluids, of both hydraulic oil and compressed gas. More simply said . . . "the weight of an aircraft rests on three pockets of compressed gas." The aircraft weight is transferred to and is identified by the measured pressures contained within the landing gear struts. With a typical hydraulic load cell, the weight is, proportional to pressure measured in "psi" (pounds per square inch). But when using an oleo type aircraft landing gear strut as a hydraulic load cell, O-ring seal friction will distort measured internal strut pressure as it relates to the amount of weight supported. The aircraft landing gear strut can be used as an aircraft weighing scale, if measured strut pressure is accurately corrected for errors caused by landing gear strut seal friction.

To illustrate landing gear strut breakout friction, strut pressure in relation to landing gear axle deflection will be discussed. The weight of the aircraft supported by the above mentioned pockets of compressed gas is transferred down the landing gear strut to the landing gear axles, which bear the load and are supported by the landing gear tires. As weight is added to the aircraft, the axles will bend and deflect. As an alternate means of determining aircraft weight, the bending/deflection of the aircraft axle can be measured and such axle deflection is directly proportional to the additional amount of weight added. The deflection of the landing gear axles represent the same load as supported by the pockets on compressed gas (when pressure corrections are made for friction), thus both methods of determining aircraft weight run parallel. The internal dimension of the horizontal cross-section of the landing gear strut cylinder does not change, thus pressure increases are directly parallel to weight increases as measured by the axle deflection sensors. Measured pressure within the strut, as it would correctly correspond to the amount of weight supported, is distorted by friction. As weight is applied to the strut, the strut will not telescopically compress until the landing gear strut seal breakout friction is overcome. Weight applied to the landing gear is simultaneously measured by the axle deflection strain gauge sensor, while pressure within the strut is monitored by the pressure sensor. The amount of weight applied to the strut, prior to the strut commencing to compress with corresponding increases in strut pressure, is equal to a load value (equivalent to overcome breakout friction) required to induce strut movement. The amount of applied weight, which is not recognized by any initial increase in strut pressure is equal to the amount of force required to overcome breakout friction.

The differential in measured weight (such as determined by axle deflection) to the weight determined by strut pressure equals the amount of weight supported by the breakout friction. The weight supported by breakout friction can be converted into a pressure correction value by dividing the breakout friction weight value as determined by the axle deflection prior to pressure change, by an amount equivalent to the load supporting cross-sectional area (measured in square inches) within the strut. The results will determine the amount of a pressure correction value (measured in psi), which is then applied to the measured pressure value, to correct for pressure errors caused by breakout friction. This process of direct comparison of strut pressure to axle deflection to determine the amount of weight required to overcome strut seal friction builds the confidence factor for other complimentary software programs used in the determination of strut breakout friction values.

The present invention offers improvements to prior art aircraft weight and balance measuring systems. Enhancements described herein incorporate an "artificial intelligence" method and software with a capability to learn and subsequently re-learn and refine the ever-changing breakout friction patterns of each respective landing gear strut. Prior art aircraft weight measurement systems simply measure breakout friction; which would have been recorded months or even years earlier, and then stored in a simple 2-dimensional look-up table within the system's computer memory, for some later use as the assumed valid correction value for errors in measured strut pressure induced by breakout friction. However, breakout friction is not a constant value. As landing gear age, friction values will change. Friction will also vary from changes in the environment, such as temperature and humidity. Aircraft landing gear designs utilize a variety of metal compounds of which different types of metals expand and contract differently at various ranges of temperature. The mating surfaces of the telescopically sliding components may create higher amounts of binding, as temperatures change. Friction values will also change due to wear on the telescopic landing gear strut's sliding components such as the piston O-ring seals, wiper ring, scraper ring, and the gland nut that holds it all together. Changes in friction are caused by scarring on the chrome finish of the main landing gear strut piston from flying gravel and debris picked-up by the nose landing gear tire and thrown against the main landing gear strut at high speeds during the take-off and landing runs. Changes in friction are caused by corrosion of the strut piston, which can leave scars from galling or blistering of the chrome finish. These and other factors will change the amount of breakout friction and leave any initially pre-programmed breakout friction correction values of the prior art, relying on stale data, offering unreliable friction correction values.

The present invention offers a system with a variety of sensors for collecting data to continually update a variety of interrelated computer memory look-up tables, creating a more advanced breakout friction database, which is used to correct for friction errors, and offer a higher level of accuracy. Thus, as the friction on a particular strut changes over time, these changes are measured and recorded in order to provide accurate aircraft weight determination.

As an example of a useful application, as an aircraft lands on a runway and taxis to a gate, the landing gear struts are telescopically extended and compressed. Strut pressures are measured as the struts telescope or move. The strut pressure changes, recorded during this "first time period" shall be referred to as the "strut pressure taxi-graph." An illustration of the "taxi-graph is shown in FIGS. 5a-5c and FIGS. 6a-6b. From this taxi-graph, breakout friction for each strut is determined by measuring high-peak and low-peak strut pressure changes, while the aircraft is taxiing at a constant weight. When the aircraft reaches the gate, it stops moving on the ground and becomes stationary. Passengers and cargo are discharged, lessening the aircraft weight and causing the struts to extend. Then, passengers, cargo, fuel, etc. are loaded onto the aircraft, increasing the weight and causing the struts to compress. After loading, and with the aircraft still stationary on the ground, at this "second time" the weight of the aircraft can be determined by measuring the strut pressures and accounting for strut breakout friction. The strut breakout friction was determined earlier in time, over a first time period; as the aircraft landed and taxied to the gate. Thus, accurate aircraft weights can be determined, at the second time when the aircraft is stationary. Further still, the strut breakout friction used in the weight determination can be adjusted to account for parameters, such as temperature, humidity, etc. (discussed in further detail below).

The first time period when strut pressure changes are measured and recorded, occurs sometime before the aircraft weight is determined. The first time period can be on the previous flight, while the aircraft is landing and taxiing to the gate. This provides data on the most recent strut, conditions. The first time period can also be sometime earlier, such as earlier in the day, in the week, the month, etc.

The taxi-graph need not be plotted as a graph, the taxi-graph is a data stream or collection of measured data over time as the strut are exercised. The struts can be exercised in a number of ways. A convenient way is during a landing and taxi to the gate.

The taxi-graph is updated with subsequent measurements obtained while the struts are exercised. For example when on a first flight of the day, the aircraft lands and taxis, a first taxi-graph is created. On a subsequent flight, when the aircraft lands and taxis, the taxi-graph is updated with fresh measurements. This updating can occur for each flight, or periodically, such as each day, each week, etc.

The present invention offers a method of subtracting the lower-peak pressure value from the higher-peak pressure value to determine a pressure range between the pressure peaks, being the "delta" pressure range. As a function of typical landing gear strut seal designs, as pressure within the strut increases, the landing gear strut seals will tend to deform and deflect more, causing increases in the seal breakout friction. Conversely as pressure within the strut decreases, the landing gear strut seals will tend to deflect less, causing decreases in the seal breakout friction. Determining accurate friction breakout correction values will depend on the ability to identify the pressure range of the delta pressure.

The amount of positive or negative pressure correction value for friction in the telescopic extension or compression of the landing gear strut is not equally symmetrical in each direction of telescopic movement about the mean or average of strut pressures. Any asymmetry can be identified by analyzing the measurements. Dividing the delta pressure in half and applying a 50% correction will allow for what might be considered an acceptable error in the determination of seal breakout friction, but further applying a slight bias to the correction value, to account for the asymmetry, will increase overall accuracy. As an example: adding +51% of delta pressure to the increasing measured pressure value of a compressing strut, or subtracting −49% from the decreasing pressure of an extending strut will allow for higher accuracy in the system. As another example, instead of using a 50% correction factor, if the asymmetry is on the high pressure side, a 51% correction can be applied.

The present invention expands on the prior art by using a combination of different sensors to better determine the amount of error induced by strut breakout friction, with an ability to continually measure and record sensor inputs to further update and refine the friction correction database. This invention also adds the feature of predicting the amount of breakout friction error by using a methodology of creating and cross-referencing multi-layers of integrated look-up tables which continually refine the database, and the ability to not only record a single snap-shot for breakout friction value, but also use the updated and refreshed data as a means to extrapolate historical, as compared to recent, measurements to better predict what the friction errors will be in the near-future, while the aircraft is stationary, prior to the aircraft leaving the gate for the next departure. The software of this new system will learn from its past experiences.

To summarize this new technology, apparatus and methods used for continuous monitoring and measuring by various sensors include:

Internal strut pressure
Internal strut temperature
External relative humidity
Landing Rear strut axle deflection
Amount of strut piston telescopic travel
Rate of strut piston telescopic travel
Aircraft vertical acceleration
Aircraft horizontal acceleration
Change in angle, of aircraft incline
Changes in wind speed and direction While the aircraft is moving on the ground, such as by bumping along the taxi-way, the telescopic landing gear strut pressure will be exercised by the weight of the aircraft working against the internal "gas spring" within the landing gear; generating strut pressure spikes, identified by high and low peak pressure values generated by the unchanging weight of the aircraft transitioning upward then downward against the struts' gas pressure spring. The recording of this pressure pattern in relation to aircraft vertical and horizontal acceleration creates an aircraft "vertical and horizontal acceleration taxi-graph."

Below is a list of the data recording events by the various landing gear component sensors, used as sensory inputs to the system's intelligent software, where the system's software can learn to make more accurate predictions of future breakout frictions values by measuring, monitoring and further trending changes in past measurements of breakout friction values as compared to current breakout friction values, and further extrapolated the trends to compile a sophisticated "friction prediction" database, stored within the memory of the system's onboard computer:

During the initial installation of the apparatus onto the aircraft, measurement of respective strut breakout friction values are recorded and stored within a look-up table within the computer memory, as the system is initially calibrated.

During the initial system calibration period the airline will use its existing aircraft weight measurement programs to determine the aircraft weight, which will be compared against the system's measured aircraft weight to allow for adjustments to the friction prediction algorithms in order to increase system accuracy.

As the aircraft then enters daily flight operations, updates to the strut pressure taxi-graph along with the vertical and horizontal acceleration taxi-graph are made when continuous measurements are recorded of strut pressure while the aircraft is taxiing, to determine the strut pressure ranges as a function of aircraft weight, as compared to delta pressure ranges as a function of breakout friction values, to those measured when the aircraft was initially calibrated. The computer will measure and record any and, all changes in strut pressure delta ranges. Examples of variations in aircraft weight ranges include:

Aircraft at highest weights and highest strut pressure ranges, as the aircraft departs for take-off, with full fuel.

Aircraft at lower weights and lower strut pressure ranges, as the aircraft arrives after landing, with minimum fuel, Aircraft at lowest weight and lowest strut pressure ranges, as the aircraft is moved to a maintenance facility, while aircraft is empty.

If, for example, sensor data acquisition rates up to 50,000 samples per second are used, then millions of recorded strut pressure data points are stored and used to generate a look-up table for corrections to pressure values, as related to a particular strut pressure range, from changes in aircraft weights, throughout various aircraft missions, where such weights remain constant during the pressure recordings while the aircraft taxis. Examples of corresponding data streams which are compiled to create the "environmental conditions taxi-graph" related to strut pressure changes include:

Continuous measurement of strut temperature as related to range of delta pressure peaks, at various pressure ranges subject to aircraft weight.
  Strut temperature and corresponding pressure data points are stored and used to generate a look-up table for corrections to pressure values, as related to specific temperature values.

Continuous measurement of relative humidity as related to range of delta pressure peaks, at various pressure ranges related to aircraft weight.
  Humidity and corresponding strut pressure data points are stored and used to generate a look-up table for corrections to pressure values, as related to specific humidity values.

Continuous measurement of the amount of landing gear axle deflection as related to the weight determination, and further used as measure breakout friction values.
  Axle deflection and corresponding strut pressure data points are stored and used to generate a look-up table for corrections to breakout friction pressure correction values, as related to changes in weight recognized by variations in axle deflection; before and after changes in strut pressure are recognized.

Continuous measurement of the amount of landing gear vertical acceleration as related to changes in the weight determination, and further used to measure breakout friction values.
  Vertical acceleration and corresponding strut pressure data points are stored and used to generate a look-up table for corrections to pressure values, as related to changes in the aircraft vertical acceleration of the upper portion of the landing gear which moves congruently with the aircraft, recognized by variations in vertical acceleration.

Continuous measurement of the angle of aircraft incline to identify situations where side-loads could affect strut telescopic friction.
  Aircraft inclination angles and corresponding strut pressure data points are stored and used to generate a look-up table for corrections to pressure values, as related to potential side-loads that would alter breakout friction values.

Intelligent, software re-starts the learning process after a landing gear strut has been overhauled with new seals, thus changing the previously stored breakout friction values, Intelligent software re-starts the learning process after a landing gear strut has been re-serviced with fresh oil, thus changing the previously stored breakout friction values. The new oil will carry less suspended dirt and, contamination, allowing better lubrication; thus changing the breakout friction values.

Intelligent software and corresponding recorded data moves with, or accompanies, the landing gear strut, in the event a particular landing gear strut is exchanged onto another aircraft.

Use of most recently collected data points (data from aircraft's most recent arrival and taxi to gate) will identify the most similar environment when evaluating: delta pressure recorded during recent taxi, current temperature within the strut (Internal strut temperatures may remain relatively high, if next departure is made within minutes. As on aircraft lands . . . intense heal is generated within the landing gear strut, such heat is a by-product of dissipating the landing load), and relative humidity; to be further used in the prediction of breakout friction correction values for the next flight that may depart from the same gate, within the next few minutes. Alternatively, data can be recorded when an aircraft leaves a gate and taxis to the runway. The struts on an aircraft taxiing for take-off are cooler, or lower in temperature, than when landing.

Aircraft weight and CG measurements can be distorted by the effects of wind passing over the aircraft wing surfaces. A puff of wind passing over the wings creates lift, which can lessen the aircraft load being transferred into the landing gear struts. Typically it takes a significant amount of wind and that wind passing across the wing surface in a specific direction, in order to generate enough lift to overcome break-out friction which distorts the weight calculations. Wind direction and wind speed can easily be measured with a Doppler wind speed and direction sensor mounted on aircraft. The sensor can be mounted at the nose of the aircraft, on the tail of the aircraft, on the fuselage or on a tip of an aircraft wing. Measurement of weight changes from the axle deflection sensors at each landing gear are compared to changes in both wind direction and velocity to build a look-up table for the correction of any weight calculation errors caused by wind passing over the aircraft wings.

It is important for any aircraft weight and balance system to have the ability to accurately determine the aircraft weight before the departure from the gate. Some prior art methods measure weight after the aircraft has finished loading, and departed the gate, while the aircraft is taxiing and the struts are being exercised. Prior of teaches of a method of simply averaging the high/low pressure peaks. This invention improves the prior art by adding additional sensors to monitor axle deflection as the aircraft taxis, as well as monitoring aircraft vertical acceleration, humidity, strut temperature and aircraft inclination. Measuring just high and low peak pressure values while the aircraft taxis does not account for load changes due to vertical acceleration of the load supported by the landing gear strut. Measuring strut break-out friction values, as related to the measured respective strut load vertical acceleration allows the software to update stored look-up table vales for break-out friction values. There are operational problems for airlines not being able to determine aircraft weight and Center of Gravity (CG) before to the aircraft departs the gate. Accurate weight and CG information is needed to insure, passengers do not need to be re-positioned within the aircraft cabin, or baggage need not be moved from within an externally accessed rear storage compartment to a forward storage compartment, to bring the aircraft CG back within the aircraft's operational limits.

The process for initiating the "friction prediction" sequence for an aircraft standing at rest:

1. Determine current strut pressure from the strut pressure sensor.

Determine if strut pressure is increasing or decreasing to further determine if strut is extending or collapsing, and to further determine appropriate positive or negative pressure correction for breakout friction.

Refer to continually updated look-up table within the software of the computer to determine appropriate "delta pressure" range for the current direction of strut movement Apply appropriate positive or negative breakout friction correction, for the current direction of strut movement.

2. Determine current internal strut temperature from the temperature sensor.

Refer to look-up table to determine appropriate pressure correction value for current temperature.

Apply appropriate pressure correction for current temperature.

3. Determine current external relative humidity from the humidity sensor.

Refer to look-up table to determine appropriate pressure correction value for current humidity.

Apply appropriate pressure correction for current humidity.

4. As a cross-check feature and confidence factor, determine current breakout friction value correction from the determination of weight differential (as determined by axle deflection) to that of the start of strut pressure changes.

Determine the proper amount of positive or negative breakout friction pressure correction to be made (based on one or more of the above)

Apply appropriate breakout friction prediction determination for strut pressure correction.

5. Make simultaneous calculations for all other respective landing gear.

6. Calculate amount of sprung weight at each strut.

7. Add unsprung weight amount to the sprung weight measurement

8. Calculate and display the amount of total aircraft weight.

9. Calculate and display the aircraft CG.

Referring, now to the drawings, wherein like reference numerals designate corresponding parts throughout the several views and more particularly to FIG. 1 thereof, there is shown a typical air transport category aircraft 1, with tricycle landing gear configuration consisting of a nose landing gear 4, and two identical twin landing gears, including a left main landing gear 7 and a right main landing gear 9 (both landing gear positioned at the same location longitudinally along the aircraft, but shown in perspective view for this illustration). Landing gear 4, 7 and 9 distribute the weight of aircraft through tires 5 which are resting on the ground 3. Electronic components which together are used in this invention, and are attached to aircraft 1 are an aircraft landing gear data harvesting system computer 11, typical inclinometer 13, typical humidity sensor 15 and Doppler wind speed and directional sensor 16.

100% of the weight of the aircraft rests upon the combined left and right main landing gears 7, 9 and nose landing gear 4. The aircraft Center of Gravity 17 can be determined by the comparing the weight supported by the combined main landing gears 7, 9 to the weight supported by the nose landing gear 4. As the percentage of the weight supported by nose landing gear 4 (in this example 8%) chances in relation to the weight supported by the combined main landing gears 7, 9 (in this example 92%), so does the location of the aircraft Center of Gravity 17. When considering the overall accuracy of an aircraft weight and CG measurement system, it should be recognized that the vast majority of the aircraft weight rests upon the combined main landing gears 7, 9. The minor amount of the weight supported by nose gear 4 allows for a much greater margin for error in the weight determination for the nose gear 4, when compared to the accuracy required in determining the weight supported by the main landing gears 7, 9.

As an example: a margin of 1.5% error in measuring the weight supported by the combined main landing gears 7, 9 supporting 92% of the total aircraft weight allows for a 7.0% margin for error in measuring the weight supported by the nose landing gear 4 carrying only 8% of the total aircraft weight; and still maintaining a system overall accuracy of 98.06%. The weight supported by each of the two main landing gear struts will be near identical. Comparison of the opposing main landing gear strut weight determinations and verification that the weights determinations are near identical will generate a greater level of confidence in the accuracy of determined breakout friction values made when both main landing gears 7, 9 breakout friction determinations are also compared, as the cross-check feature of this system is established.

The number of linear inches of the strut O-ring seal length, being the circumference of the landing gear strut piston, reduces in relation to an increased diameter of the landing gear strut. As an example, if you remove one of the rubber O-ring seals from a 12" diameter main landing gear strut cylinder which has a cross-sectional, load supporting surface area of 113.10 square inches, proceed to cut that O-ring seal, then stretch the seal out next to a measuring tape; the overall length of that seal will be 37.70 inches long (circumference equals π "pi" times the diameter). As a second example, if you remove one of the rubber O-ring seals from a 5" diameter nose landing gear strut cylinder which has a cross-sectional, load supporting surface area of 19.63 square inches, proceed to cut that O-ring seal, then stretch the seal out next to a measuring tape; the length of that seal will be 15.71 inches long. With the error in strut pressure as related to weight supported directly related to landing gear strut seal friction, reducing the linear inches of seal length in relation to the amount of load supported allows for less error in the larger main landing gear strut, when compared to the error of the nose landing gear strut. These example illustrate the preference to take additional steps such as comparing each identical main landing gear strut breakout friction errors for similarity, will allow an increase in confidence of the accuracy in measuring the weight supported by the main landing gear strut, being that the vast majority of the aircraft weight (92%), which is supported by the combined main landing gear struts.

Referring now to FIG. 2a, there is shown a side view of an aircraft telescopic oleo main landing gear strut 7 with tire 5 which distributes supported aircraft weight onto the ground 3; further illustrating landing gear strut cylinder 19, in which strut piston 21 moves telescopically. Piston 21 is prevented from rotation within cylinder 19 by a torque-link mechanism, which incorporates an upper torque-link member 23 and a lower torque link member 25. A "scissor-action" movement is created by the rotation of the torque-link hinge 31. Upper torque-link member 23 is connected to strut cylinder 19 by an upper bearing 27. Lower torque-link member 25 is connected to strut piston 21 by a lower bearing 29. Pressure within telescopic strut 7 can be measured and continually monitored by upper pressure sensor 35 and lower pressure sensor 37. Pressure sensors 35 and 37 are designed and equipped with an internally attached temperature probe which will measure and monitor temperature changes within the strut 7. Landing gear strut 7 has an internal orifice mechanism that restricts the flow of fluid within the strut. Such fluid-flow restrictions will cause pressure measurements made at upper pressure sensor 35 to be different from the simultaneous measurements made at lower pressure sensor 37 while the strut 7 is rapidly compressing or extending.

Referring now to FIG. 2b, any change in the angle created at torque link hinge 31 rotation is measured by an attached rotation sensor 43. The changing angle between upper torque-link member 23 and lower torque-link member 25 is measured by the electronic output from the rotation sensor 43. Angle changes measured by rotation sensor 43 are proportional to the amount of, telescopic travel of piston 21 within cylinder 19. The rate of angle change is, proportional to the rate of telescopic strut movement. Alternative locations for the attachment of rotation sensor 43, for the measurement of torque-link movement, are at upper bearing 27 and lower bearing 29. An alternate means to measure the amount and rate of telescopic movement of piston 21 is by comparison of the output data of accelerometer 39 attached to cylinder 19, to that of the output data of accelerometer 41 attached to the telescopically movable piston 21. Telescopic movement of piston 21 from within cylinder 19 can also be measured by a Linear Variable Differential Transformer ("LVDT") 44. Landing gear piston 21 incorporates an axle 53 which has a strain gauge sensor 55 bonded to the interior wall of axle 53. Strain gauge sensor 55 measures axle 53 bending/deflection; and will be further defined in FIG. 3.

Referring now to FIG. 3, there is shown a front view of main landing gear 7, where telescopic piston 21 recedes into strut cylinder 19 as weight is applied to the aircraft (as shown by downward pointing vertical arrow "Applied Weight"). The landing gear tire 5 further supports the applied weight, as it is further transferred to the ground 3. Pressure sensor 35 monitors and measures the changing pressure within strut 7.

As weight is applied to strut 7 landing gear axle 53 will deflect and yield proportionally to the additional weight applied. Axle deflection is measured by a strain gauge sensor 55.

Pressure within landing gear strut 7 as measured by pressure sensor 35 would typically be proportional to the amount of applied weight; but components of the landing gear cylinder 19 which retain fluids and internal pressure such as gland nut 45, piston wiper 47, piston scraper 49 and plural O-ring seals 51 create friction as they rub against the surface of piston 21, and create errors in the measured strut pressure, as that pressure would relate to the amount of weight supported by landing gear strut 7.

As an example: when weight is initially added to an aircraft and subsequently that weight transferred to the landing gear 7, piston 21 should immediately telescopically recede within cylinder 19, and pressure within cylinder 19 as recorded by pressure sensor 35 should immediately increase. This does not happen. The initial weight applied to strut 7 will be supported by landing gear strut seal friction from components including gland nut 45, piston wiper 47, piston scraper 49 and plural O-ring seals 51; where friction supporting that initial applied weight creates a falsely low pressure measurement as related to the amount of actual weight supported. The measured pressure within strut 7 will remain falsely low, even with the addition of more weight, until the amount of such additional weight overcomes the weight supporting forces of seal friction and then allows the strut to compress. Once seal friction has been overcome, strut pressure will increase in direct proportion to the amount of additionally applied weight, but remain falsely low in proportion to the amount of initial weight, supported by the continued friction.

A similar but opposite error in pressure as related to weight supported occurs as weight is removed from the landing gear. Strut friction will tend to trap the internal pressure within the strut 7 until enough weight has been removed that internal strut pressure will now overcome the seal breakout friction, allowing the strut piston 21 to now extend. Strut pressure will then be falsely high in relation to weight supported, caused by the seal friction restricting the strut's telescopic movement. The difference between the measured strut pressure, as compared to the weight determination of the axle deflection sensor, will identify the amount of error in the measured pressure caused by seal friction.

Other factors affect and deviate what might otherwise be considered in various prior art methods as a predictable amount of landing gear strut seal breakout friction. Blemishes 57 and/or scarring 59 of the chrome, finish of piston 21 will create a more "coarse surface" and increase the amount of breakout friction which must be overcome to recognize any pressure changes within strut 7, as plural O-ring seals 51, piston wiper 47 and piston scraper 49 travel across the blemished surface of piston 21.

Prior art use of strain gauge sensors to measure axle deflection to determine aircraft weight have met with little success, reference to U.S. Pat. No. 3,473,369—Garrison. These strain gauge systems have been questioned in their ability for maintaining the high accuracy and reliability requirements for operations. The use of the axle deflection sensor 55 in this new invention does not require sensor 55 to function and measure aircraft weight for every departure, but rather the sensor is used as part of the data collection process, thus any failure in reliability will not cause an airline to delay or cancel a flight, but rather need only to replace any failed sensor 55 the next time the aircraft is brought to the hanger for maintenance. The determination of the amount of breakout friction is made through measurement of applied weight as identified by the axle deflection sensor 55 until such time as strut pressure begins to change. This determination of breakout friction value can be done in real-time or can be periodically measured and recorded within a look-up table, for future use. Today's requirements for aircraft weight measuring system accuracy tend to be within 98% or better. Implementing a system with less than a 2% margin for error is a challenge for any type of aircraft weight measuring system. When considering the use of strut pressure to determine aircraft sprung-weight, the methods of multiplying the raw (un-corrected) strut pressure measurements, times the number of square inches of load supporting surface area within the respective landing gear strut will result in overall aircraft sprung-weight error reaching 7%.

The blending of designs for monitoring axle deflection, with a method of measuring just the initially applied weight supported by friction (as opposed to measuring total aircraft weight), can be joined together with the strut pressure measurement approach, to deliver a more accurate determination of strut breakout friction values and deliver a more accurate aircraft weight determination.

Correcting for the strut friction errors with an ability to measure aircraft weight within a 2% window in the overall accuracy allows for the measurement for the actual amount of frictional error of the measured pressure to be within a much larger window for error. The requirement to measure just the friction (not the weight) need only be accurate to within a 28% margin for error.

The representing equation: 7% (friction error)×28% (window of allowable error to measure and correct for friction) =1.96% (overall system error). Thus having an axle deflection strain gauge sensor 55 to measure initially applied weight to landing gear strut 7, need only require accuracy to 72% in measuring this initially applied weight. The strain gauge sensor measuring axle deflection is used simply to measure the amount of weight applied to axle 53 deflection prior to any increase in strut pressure, until strut seal breakout friction has been overcome and strut pressure begins to increase; identifying the measurement of the amount of initially applied weight required to overcome breakout friction; thus the axle deflection sensor would need only to have an accuracy requirement of 72%, to maintain an overall system accuracy of 98.04%.

A bold solid line 54 is shown running horizontal across the center-line of landing, gear axle 53 and represents an un-deflected posture of the landing gear axle 53. As weight is applied, axle 53 will deflect. A bold dashed-line 56 representing deflection of axle 53 is shown running adjacent to the un-deflected solid line 54. The amount of deflection of landing gear axle 53 is directly proportional to the amount of weight applied. As weight is applied to the aircraft, axle 53 will deflect prior to the commencing, of telescopic piston 21 to recede into strut cylinder 19. Simultaneous measurements are made with both pressure sensor 35 and strain gauge sensor 55. As weight is applied to strut 7, the increase in weight will be immediately sensed by strain gauge sensor 55. Pressure sensor 35 will recognize no increase in strut pressure until enough weight has been added to overcome the breakout friction of the plural strut seals 51, scraper 49 and wiper 47 used to dean the exterior surface of piston 21. Once enough initial weight has been applied to overcome breakout friction, pressure sensor 35 sill begin to detect increases in strut pressure as the internal volume within strut 7 decreases, as position 21 recedes into strut cylinder 19, with such pressure increases being proportional to the amount of additional weight being applied, but will remain falsely low as compared to total weight supported. The amount of additional weight recognized and measured by strain gauge 55 prior to pressure sensor 35 recognizing a parallel pressure increase, is equal to the amount of the breakout friction error, as measured in pounds. Converting this breakout friction error measured as pounds, into an equivalent value represented as pressure (measured as psi), is a simple equation of dividing the measured initial weight value identified as the breakout friction error measured by the strain gauge sensor 55 as, pounds, by the number of square inches of load supporting surface area (measured horizontally) across the interior walls of strut cylinder 19. The resulting breakout friction correction value, measured as psi, can then be added to the current strut pressure measured as psi; which combined total psi is then multiplied times the load supporting area within the strut, which will correctly represent the amount of sprung-weight supported.

These important equations for measuring the amount of pressure error induced by breakout friction are repeated at various aircraft weights, and are measured at each and every aircraft loading and unloading event. This measurement of breakout friction data is stored within the computer memory to be referenced at the next request for the determination of landing gear strut seal breakout friction.

Additionally, measurements of strut pressure as it corresponds to axle deflection patterns are recorded while the aircraft taxis at high weights with full fuel tanks before flight and at lower weights after flight with empty fuel tanks. These important data acquisition routines are repeated, at various temperatures and ranges of external humidity, allowing the compilation of a sophisticated matrix creating a multi-level look-up table of strut seal breakout friction correction values of the ever-changing value of strut frictional forces. The amount of error in pressure as related to weight supported, induced by strut friction, can be measured, continuously monitored and with further trending of recent data as compared to historical records of the accumulated data, compile a basis for extrapolations for future predictions of the amount of error in strut pressure as related breakout friction, without the need as required by the prior art, for the exercising of the strut in real-time to measure friction. Subsequently strut pressure measurements and accurate corrections for breakout friction errors can be applied while the aircraft is stationary, prior to the aircraft departing the gate.

Referring now to FIG. 4a, there is shown a side view of a typical aircraft telescopic landing gear strut 7, further identifying strut cylinder 19, in which strut piston 21 moves telescopically within cylinder 19. Piston 21 is prevented from rotation within cylinder 19 by a torque-link mechanism, which incorporates an upper torque-link member 23 and a lower torque-link member 25 joined at a torque-link hinge 31. A "scissor-action" movement is created by the rotation of the torque-link hinge 31 connected to both upper torque-link member 23 and lower torque-link member 25. The identification and measurement of landing gear torque-link hinge 31 rotation is measured by a rotation sensor 43. Main landing gear tire 5 is mounted onto a typical landing gear wheel and is connected to piston 21 at the landing gear axle 53.

Strut 7 is attached directly to and moves congruently with aircraft hull 1. Movement in both horizontal and vertical directions of aircraft hull 1 is monitored by a multi-axis accelerometer 39, which measures horizontal and vertical movement of strut 7. Pressure within landing gear 7 is monitored by a pressure sensor 35. Deflection/bending of main landing gear axle 53 is measured by a strain gage sensor 55. The vertical acceleration of aircraft hull 1 as measured by multi-axis accelerometer 39 is used to calculate and correct for the force of the weight supported by a respective strut which is artificially amplified and diminished by being transferred to and from the actual load as represented by strut pressure as the aircraft taxi and periodically bounces along the taxi-way, to further refine and determine strut friction break-out values.

Referring now to FIGS. 4b, 4c and 4d there are shown examples of a continuation from FIG. 4a where aircraft 1 has begun to move horizontally and is illustrated by the "Forward movement" box with a horizontal arrow passing through it. As aircraft 1 begins to taxi, over sometimes an uneven, airport ground surface 3; the aircraft weight supported by the pockets of compressible gas (which works as an internal spring contained within the telescopic strut 7), such spring will cause aircraft 1 to move vertically, upward and downward; further causing the internal strut pressure to surge and oscillate with increases and decreases in strut pressure. Though the aircraft weight remains constant, the inertia of the weight transfer over the rough taxi-way surface will cause internal strut pressure to change, with a pattern of high and low pressure peaks. This upward and downward movement of aircraft 1 will transfer to compression and extension of telescopic strut 7 and is further illustrated by increasing and decreasing internal strut pressure, as aircraft 1 moves horizontally along the uneven surface of ground 3, represented by bump 60 and depression 62. Vertical movement of the unchanging weight, which is supported by the landing gear will create break-out pressure values which are greater than just the break-out friction values of a stationary aircraft. Computer algorithms correct measured pressure break-out friction values in relation to the amount of inertia, as measured and determined from vertical acceleration in relation to the amount of the load supported.

As aircraft 1 moves from the location in FIG. 4a to subsequent locations, the aircraft strut compresses slightly as it encounters a hump 60 in the airport taxiway (FIG. 4b), then extends back (FIG. 4c) with even further extension as the wheel drops at a depression 62 in the airport taxiway surface (FIG. 4d). As aircraft 1 moves upward and downward, with the compression and extension of piston 21 into cylinder 19; the pressure sensor 35 senses the varying pressure inside the strut—1,800 psi, 1,814 psi, 1,800 psi and 1,786 psi respectively. In addition, the accelerometer 39 senses the vertical movement of aircraft 1, as does strain gauge sensor 55 measuring the changing load reflected by the deflection of axle 53. The accelerometer 41 measures movement of the lower telescoping section of the strut. Data streams illustrating these patterns of increased and decreased pressures, along with variations in axle deflection and vertical accelerations will be shown in FIGS. 5a, 5b and 5c. Computer software contained within the system (discussed in FIG. 7) has the ability to confirm the aircraft weight is constant, by recognizing that the aircraft is physically moving, through comparison of asymmetrical acceleration data between accelerometer 39 to that of accelerometer 41 and will also determine the rate of strut 7 telescopic extension which is directly proportional to the rate of aircraft 1 vertical acceleration. An additional software program concurrently processes an inertial weight transfer algorithm measuring the direction and rate of accelerated weight movement which is supported at the respective strut; as further consideration in the calculation of the respective landing gear breakout friction, at that moment in time. As an additional cross reference feature, rotation sensor 43 measures the amount of, and rate of, telescopic travel of piston 21 within cylinder 19.

While the aircraft taxis, the "delta pressure", being the difference in pressure between the high-peak pressure (1,814 psi) and the low-peak pressure (1,786 psi), within the strut is measured. The delta pressure pattern will change as the breakout frictional forces affecting the various elements of the landing gear change. Changes in these breakout frictional force patterns can range from factors such as:

Increased seal friction, induced by greater aircraft weight, resulting in higher internal strut pressure, further inducing higher levels of strut seal deformation (typical in seal designs) to maintain the internal fluid containment, Increased seal friction induced by lower humidity and/or a drier strut component surface, Increased seal friction induced by lower temperatures, causing a change in the pliability of the seals, Decreased seal friction induced by lower aircraft weight resulting in lower strut internal pressure, Decreased seal friction induced by higher humidity and the added lubrication offered by moisture to strut component surfaces, Decreased seal friction induced by higher temperatures, Aircraft vertical acceleration.

These higher and lower ranges of delta pressure are typical, as aircraft do not always operate with similar weight values nor in constant environmental conditions. Continual trending of the various sensor data patterns and the further discovery of unexpected patterns in higher ranges of delta pressure will often result from atypical friction patterns, induced by factors such as Scarring or damage to the chrome finishes on the strut piston, which telescopically slides in and out of the strut cylinder.

Additional binding within the various bearings of the landing gear strut torque-link mechanisms Additional binding, from damage to a strut seal, piston wiper, piston scraper, and/or cylinder gland nut.

Though any and all of the possibilities listed above can change the delta pressure as measured while the aircraft taxis, they all are measured, monitored and further trended to better predict the delta pressure value to be properly applied while the aircraft is at a departure gate, stationary and at rest; to further calculate a more accurate breakout friction pressure correction value, to further determine the weight value at the next request for a weight determination, prior to the aircraft departing the gate.

Referring now to FIGS. 5a, 5b, 5c, there are shown examples of taxi-graphs, being the comparison of parallel data streams from various sensors monitoring landing gear strut pressure as measured by the pressure sensor, vertical acceleration as measured by one of the accelerometers, and axle deflection as measured by strain gauge. All three, sensors will experience identical loads experienced by the landing gear strut and changes in these loads, as the aircraft taxis. Trends in these data streams, which are measured in real-time, reveal patterns which are compared to historical patterns of the same strut; and the compared data is further extrapolated to correlate future breakout friction predictions. The aircraft weight and CG remain constant in FIGS. 5a-5c.

Referring now to FIG. 5a, there is shown an example of a different taxi-graph, being the data stream from a strut pressure sensor measuring changes in internal strut pressure, representing a delta pressure pattern as the aircraft begins to taxi. The solid zig-zag line 61 represents measured strut pressure within the landing gear strut, as the aircraft bumps along a taxiway (as shown in FIGS. 4a and 4b). The system computer monitors and records this pressure data stream (for example at sample rates reaching 50,000 measurements per second). Software programs average the high-peak pressure measurements to determine a high-peak pressure average, illustrated by the upper dotted line 63 and average the low-peak pressure measurements to determine a low-peak pressure average, illustrated by the lower dotted line 65.

Further averaging of all high-peak pressure measurements and all low-peak pressure measurements will determine a mean/median pressure value which will identify landing gear strut pressure as related to weight supported, net of breakout friction errors, illustrated by the centered dashed line 67.

While an aircraft is stationary and a request is made for a weight determination from each respective landing gear strut, the software in the computer will determine if pressure within the strut is increasing or decreasing. As an example, as weight is added at the front door of the aircraft, the nose landing gear will compress and internal pressure will increase. As that weight moves aft within the aircraft fuselage, the weight is transferred from the nose landing gear to the main landing gear, where the nose landing gear pressure will now decrease.

A determination must first be made if the pressure in the strut is increasing or decreasing. Once the determination is made as to which direction the strut piston is traveling (continuing with the example of adding weight to the aircraft, the strut is compressing) a further determination is made as to the most recently recorded and stored delta pressure patterns to identify the amount of pressure differential between the high-peak pressure average 63 to that of the median pressure 67, and add that breakout friction correction value (either measured in psi from the aircraft taxi, or as initial applied weight measured in pounds and converted to psi, as described with respect to FIG. 3) to the strut pressure which has a measured pressure and determined to be increasing in pressure, which further identifies the strut is compressing and further recognizing the strut pressure will be falsely low due to breakout friction errors. Conversely, if the measured pressure within the strut is decreasing, further recognizing the strut is now extending, the pressure differential between the low-peak pressure average 65 to that of the median pressure 67 is subtracted from the current pressure measurement, further recognizing strut pressure will be falsely high due to breakout friction. The delta, pressure pattern used in this action is not a single look-table of data points recorded and stored possibly months or even years earlier within the computer memory, but rather the most recent data available from a learning program that continually updates the delta pressure patterns with fresh data.

Figure 7:
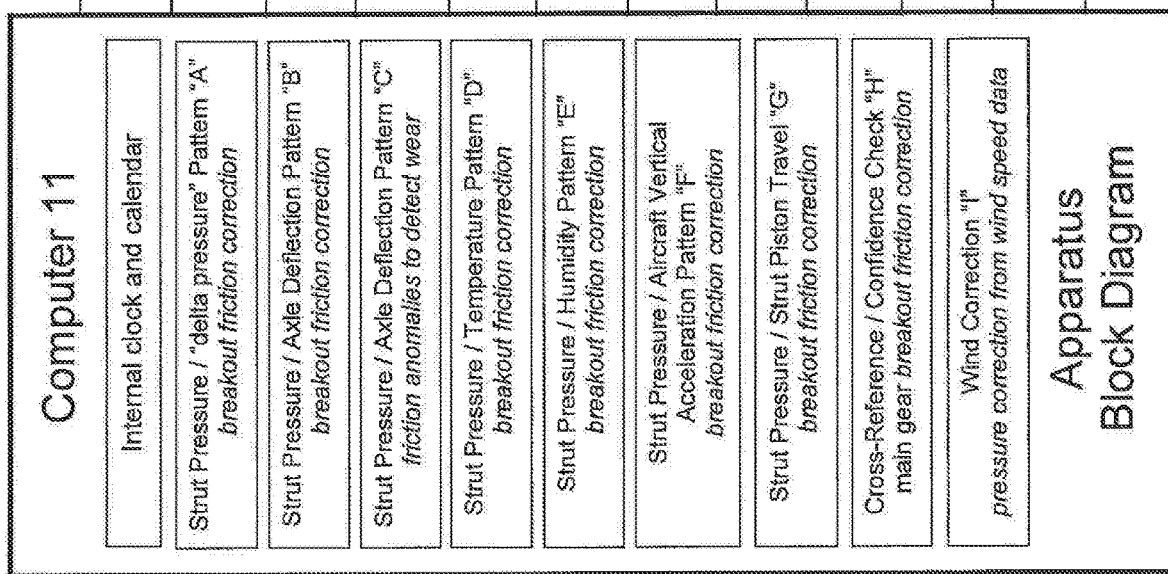
FIG. 7 is a schematic diagram of the onboard computer with sensor inputs that support the friction prediction software programs of this invention.

These breakout friction patterns are also used as a cross-referencing tool for verification by comparisons made between opposing main landing gear struts, to better determine a confidence factor (described as "Confidence Check H" FIG. 7). The software develops a separate memory and look-up table of previous breakout friction measurements for opposing main gear struts on a specific aircraft, where the breakout friction off-sets are continually updated and applied. A confidence factor for the friction off-set is developed, by cross-referencing a comparison of main landing gear friction prediction patterns, on opposing main landing gear to increase the validity of the friction prediction. As an example, it is unlikely that the breakout friction values for a particular landing gear will be identical throughout a multitude of landings. If the measured and then compared breakout friction predictions/valuations between the opposing main landing gear struts on the same aircraft have historically repeated with asymmetrical values, with a further consistency in a particular range of asymmetry, the asymmetrical and repeatable pattern is confirmed. If some unknown event causes a change in the measured then compared patterns, and later reveals a diversion from the validated historical pattern trends, and a new pattern repeats along a uniquely different but stabilized path, seal wear or piston surface scarring is detected, and a revised breakout friction prediction is generated from data recorded and learned along this new path. This cross-check verification tool will add to the confidence factor that the breakout friction predictions are correct.

Referring now to FIG. 5b, there is shown an example of the data stream or taxi-graph from the strain gauge sensor 55 attached to the axle 53 of the landing gear shut (as shown in FIG. 4a-4d). The solid zigzag line 69 represents measured axle deflection, as the aircraft bumps along a taxiway. Changes in load are reflected by changes in axle deflection. These deflection patterns are used as a cross-referencing tool to create a confidence factor that pressure delta patterns (of FIG. 5a) induced by changes in load (as the aircraft bumps) are congruent with the axle deflection patterns.

Referring now to FIG. 5c, there is shown an example of the data stream or taxi-graph from the accelerometer 39 attached to the landing gear strut cylinder 19 (both shown in FIG. 4a). The solid zig-zag line 71 represents measured vertical acceleration, as the aircraft bumps along a taxiway.

Changes in load are reflected by changes in acceleration. These acceleration patterns are used as a cross-referencing tool to create an additional confidence factor that pressure delta patterns (of FIG. 5a) induced by changes in load (as the aircraft bumps) are congruent with the vertical acceleration patterns.

Referring now to FIG. 6a, there is shown an example of a data stream or taxi-graph of "delta pressure" (as defined and shown in FIG. 5a) within a landing gear strut with a high internal pressure, representing an aircraft which is heavily loaded and is taxiing. Higher internal strut pressure will apply additional force onto the internal landing gear strut O-ring seals, where the flexible nature of the compounds of these seals will tend to deflect/deform more as strut pressure increases. The increased seal deflection helps to retain and contain/capture the higher pressure of the internal fluids. A by-product of this increased containment force creates a higher amount of breakout friction between the pliable O-ring seal materials and the rigid metal surfaces of the strut cylinder walls. Airports runways and taxiways are typically concrete surfaces. Though these surfaces are somewhat smooth, imperfections in the concrete surfaces such as expansion joints and cracks will create a surface that will cause the strut to bump as the aircraft taxi.

Referring now to FIG. 6b, there is shown an example of a data stream or taxi-graph of "delta pressure" within the same landing gear strut as shown in FIG. 6a, but with a lower internal pressure, representing the same aircraft which is lightly loaded and is taxiing. Lower internal strut pressure will apply lesser force onto the landing gear strut O-ring seals, where the seals will tend to deflect less than within the same strut having a higher pressure. The reduced seal deflection reduces the amount of pressure delta, as the aircraft taxi.

A comparison of the delta pressure pattern shown in FIG. 6a to that of a similar but closer range of high-peak pressures to low-peak-pressures as shown in FIG. 6b, serve to better illustrate that landing gear strut seal breakout friction values can vary as a function of aircraft weight. The identification of variations in the strut pressure range as well as the variations in delta pressure range are important when considering the next "near-future" request for friction prediction as a pressure correction value, while the aircraft is sitting stationary at the gate.

The measurement, trending and storage of the various delta pressure patterns, as each of the respective struts age, will help in the ability for the system software to create, refresh and re-create more accurate look-up tables, to better predict, the pressure correction value at the next request for that information, at a time where the pressure ranges and environmental conditions may be different. The various features of the "Friction Prediction Software" are fully disclosed in the subsequent description of FIG. 7.

Referring now to FIG. 7, there is shown an Apparatus Block Diagram illustrating the various components which make up the apparatus of the invention, where multiple (nose, left-main and right-main landing gear) upper pressure sensors 35 and lower pressure sensors 37, and landing gear torque-link movement monitoring rotation sensors 43, and axle deflection sensors 55; along with upper strut cylinder accelerometer 39 (which additionally measure aircraft 1 hull acceleration) and lower strut piston accelerometer 41 which compared data from upper accelerometer 39 to such different vertical acceleration from lower accelerometer 41 will measure landing gear telescopic movement, and aircraft inclinometer 13, and humidity sensor 15, and Doppler wind speed/direction sensor 16 are all sources of data which input into computer 11.

The methods and apparatus of this invention are used for harvesting a variety of data from the landing gear strut, where multiple sensors for collecting data continually measure and update the landing gear strut breakout friction database, used to correct for landing gear strut breakout friction errors in strut pressure as related to sprung weight supported, to offer an improvement and higher level of accuracy to prior art systems which use strut pressure to measure aircraft weight. This new capability expands from the simple 2-axis look-up table used in prior art systems, into a new multi-dimensional matrix of data cross-references; using multiple sensors to better determine the amount of strut pressure errors induced by strut breakout friction, with the ability to continually measure and record sensor inputs to update and refine the friction correction database. This invention also adds the feature of predicting the amount of breakout friction error using a methodology of cross-referencing the multi-layers of integrated look-up tables which are continually refining the database, in an ability to not only identify the pressure errors induced by breakout friction but also using the updated data as a means to predict what the errors will be, prior to the aircraft leaving the gate for the next departure. The software has the capability to learn from the input of recent data, captured within minutes of the next friction prediction request.

Computer 11 is equipped with an internal clock and calendar to document the time and date of stored data. Computer 11 has multiple software packages which include:

Strut Pressure/"delta pressure"—Pattern "A"—a software program for a continual updating of an initially created look-up table for strut breakout friction correction adjustments by monitoring aircraft landing gear strut pressure increases and decreases as the aircraft taxis, while at a constant weight, where continual measurement and monitoring of strut delta pressure ranges are compared to high-peak pressure and low-peak pressure differential pressure patterns within the measured pressure range. The delta pressure data is further recorded and stored for future use. The delta pressure data is subsequently and continually updated and refined with the most recent data available, to compare against prior measured data to trend and better predict the amount of pressure correction needed the next time the aircraft is at rest, and a weight determination is requested.

Strut Pressure/Axle Deflection—Pattern "B"—a software program for monitoring aircraft landing gear strut pressure increases and decreases as related to the respective axle deflection both upward or downward, while the aircraft is stationary to determine the amount of initial weight applied or removed to overcome strut breakout friction, to further determine an accurate pressure correction value (as described in FIG. 3 above). Being a look-up table capable of continuous update, whereby stored within the memory of the system's computer are the initially recorded values of strut pressure changes as they relate to measured amounts of axle deflection, which are subsequently and continually updated and refined to develop trends with the most recent data available, to better predict the amount of pressure correction needed the next time the aircraft is at rest, and a weight determination is requested.

Strut Pressure/Axle Deflection—Pattern "C"—a software program for monitoring aircraft landing gear strut pressure as related to axle deflection as the aircraft taxis to better refine the delta pressure values as compared to load determinations from axle bending, to refine the software's ability to measure atypical friction anomalies created by abnormal seal wear or potential scars to the landing gear piston surface (as described in FIG. 4 above). Being a look-up table capable of continuous update, whereby stored within the memory of the system computer are the initially recorded values of strut pressure as they relate to the measured amount of axle deflection for a new or freshly overhauled landing gear, which are subsequently and continually updated and refined with the most recent data available, to better identify unexpected changes in pressure breakout friction patterns as they relate to changes in applied weight, to better predict the amount of pressure correction needed the next time the aircraft is at rest, and a weight determination is requested.

Strut Pressure/Temperature Pattern—"D"—a software program for correcting aircraft landing gear strut pressure as related to strut temperature, to further determine a proper strut breakout friction correction value. A look-up table capable of continuous update, whereby stored within the memory of the system's computer is a correction table, which is subsequently and continually updated and refined with the most recent measured data available of actual temperature relationships to the measured amount of breakout friction, to better predict the amount of pressure correction, further corrected for variations in temperature, needed the next time the aircraft is at rest, and a weight determination is requested.

Strut Pressure/Humidity Pattern—"E"—a software program for monitoring aircraft landing gear strut pressure as related to external relative humidity, to further determine a proper strut breakout friction correction value. A look-up table capable of continuous update, whereby stored within the memory of the system computer are the initially recorded values of strut breakout friction as they relate to the measured external relative humidity, are subsequently and continually updated and refined with the most recent data available, where recorded changes in relative humidity and their relationship to previously recorded changes in strut breakout friction values are stored. Trends are identified, extrapolated and projected to better predict the amount of pressure correction needed the next time the aircraft is at rest, and a weight determination is requested.

Strut Pressure/Aircraft Vertical Acceleration Pattern—"F"—a software program for monitoring aircraft landing gear strut pressure as related to the aircraft vertical acceleration. A look-up table capable of continuous update, whereby stored within the memory of the system computer are values of changes in strut pressure and changes in axle deflection as they relate to changes in vertical acceleration of the aircraft as the aircraft taxi at various weights, which are subsequently and continually updated and refined with the most recent data available, to strengthen an internal confidence check software of corresponding look-up tables, to better predict the amount of strut pressure correction for breakout friction, due to stint pressure changes associated without any weight change; further associated with the inertia created by the aircraft weight oscillating through upward and downward vertical acceleration during taxi; as needed the next time the aircraft is at rest, and a weight determination is requested, Strut Pressure/Strut Piston Travel Pattern—"G"—a software program for monitoring aircraft landing gear strut pressure as related to changes in the amount of strut telescopic extension to further measure the amount and location of strut piston travel across the strut cylinder seals, to further determine a proper strut breakout friction correction value. A look-up table capable of continuous update whereby stored within the memory of the system computer are the initially recorded values of changes in strut pressure as they relate to changes in the amount and location of strut seal travel over different regions of strut piston surface and rate of changes of piston travel as the strut telescopically extends and compresses. Additionally a look-up table relating changes in the amount of typical breakout friction correction as compared to the location on strut piston of frequent O-ring seal travel, to identify areas on the piston where atypical breakout friction values are caused by imperfections in the strut piston surface; which are subsequently and continually updated and refined with the most recent data available, to better predict the amount of strut breakout friction correction needed the next time the aircraft is at rest, and a weight determination is requested.

Cross-Reference/Confidence Check—"H"—a software program for increasing the confidence that a friction prediction value is reasonable. When considering the overall accuracy of an aircraft weight and CG measurement system, it should be recognized that the vast majority of the aircraft weight rests upon the combined main landing gear. A software program for the monitoring of a breakout friction prediction for a main landing gear strut, which is simultaneously compared to the breakout friction prediction for the opposing main landing gear strut. It will be assumed both struts are supporting a similar amount of weight and the relative humidity will be the same. Comparison of historical trends in the parallel breakout friction patterns of both main gear struts will be compared to the current breakout friction predictions to verify the trends of each strut are following a stable path. The stability of the breakout friction patterns will offer a confidence check that the friction predictions are valid.

Correction—"I"—a software program for increasing the accuracy of aircraft weight measurement, by-passing the friction prediction procedures. Wind passing over the aircraft wings can generate wing-lift which can lower the value of a measured, aircraft weight, without any change in strut pressure being identified. The Doppler wind speed sensor 16, attached to the aircraft, measures speed and direction as the wind passes over the aircraft, and in particular over the wings. The wind direction is relative to the aircraft. Wind coming from the nose has more lifting capability than wind coming perpendicularly to the fuselage. The wind measurements are taken simultaneously with the weight measurement, whether the weight measurement is by strut pressure, axle deflection, strut linkage rotation, etc. Friction prediction need not be used. Any reduction in weight caused by the wind on the aircraft is used to correct the weight measurement. A lookup table can be used, which factors in wind speed, direction and aircraft weight. For example, when the weight measurement is taken, if the wind is coming directly from the nose direction (using a compass notation, zero degrees) and is 20 knots, the lockup table is consulted to determine the lift caused by the wind. This is deducted from the aircraft weight. A lower wind speed from the same direction, such as 5 knots, will have less lift so that the correction will be less. Wind coming from a perpendicular direction, such as 90 degrees or 270 degrees, likely will produce little or no lift, with a minimal correction factor.

Of the various software programs herein defined, described and illustrated the ability to cross reference pressure changes as related to axle deflection and further adjustments made due to environmental changes, all create a building-block approach to the highest possible accuracy in a strut pressure measurement system for aircraft weight and CG, which do not exercise the landing gear struts to measure strut seal friction in real-time.

Airlines may evaluate the system's overall accuracy as compared to complexity and maintainability of the multiple layers of the s stems and sensors described herein, where potentially higher acquisition and maintenance costs can result in the use of some of the features of this system, where some features and hardware may be omitted; if the slight reduction in overall accuracy allows the system to maintain the accuracy requirements for that airline's specific operations.

The present invention has been described as adding additional computer and software and hardware features to prior art apparatus and methods of measuring aircraft weight; with such embodiments attached to telescopic elements, of oleo type aircraft landing gear struts, the invention could also apply to other types of industrial telescopic deices.

Additionally as an exemplary embodiment of the invention has been disclosed and discussed, it will be understood that other applications of the invention are possible and that the embodiment disclosed may be subject to various changes, modifications, and substitutions without necessarily departing from the spirit and scope of the invention.

The invention claimed is:

1. A method of determining aircraft weight, the aircraft having landing gear struts, each landing gear strut comprising a piston telescoping in a cylinder, the strut comprising fluid and a seal, the piston experiencing breakout friction with the cylinder, comprising the steps of:
   a. taxiing the aircraft so as to cause taxi induced telescopic movement of the piston within the cylinder over time;
   b. measuring a pressure over time of the fluid during such taxi induced telescopic movement, the measured pressure having high pressure values and low pressure values;
   c. identifying an asymmetry of the high and low pressure values about a mean of the measured pressures;
   d. applying a correction factor to the measured pressures to determine weight of the aircraft, with the correction factor including the identified asymmetry.

* * * * *